United States Patent
Billig et al.

(10) Patent No.: US 7,357,208 B2
(45) Date of Patent: Apr. 15, 2008

(54) CONTROL SYSTEM FOR AN AT LEAST TEMPORARILY FOUR WHEEL-DRIVEN MOTOR VEHICLE

(75) Inventors: Christian Billig, Munich (DE); Thomas Hopper, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 39 days.

(21) Appl. No.: 11/397,559

(22) Filed: Apr. 5, 2006

(65) Prior Publication Data

US 2006/0180374 A1     Aug. 17, 2006

Related U.S. Application Data

(63) Continuation of application No. PCT/EP04/11167, filed on Oct. 6, 2004.

(30) Foreign Application Priority Data

Oct. 8, 2003   (DE) ................... 103 46 671

(51) Int. Cl.
 B60K 28/16   (2006.01)
 B60K 17/35   (2006.01)
 F16D 43/20   (2006.01)
 B60W 10/02   (2006.01)

(52) U.S. Cl. .................. 180/197; 180/248; 192/54.1; 477/86

(58) Field of Classification Search ............... 701/67, 701/68, 69, 87, 89; 180/197, 247, 248; 477/39, 477/70, 79, 86; 192/54.1
 See application file for complete search history.

(56) References Cited

U.S. PATENT DOCUMENTS 4,776,424 A * 10/1988 Naito .................... 180/233
4,825,368 A *  4/1989 Itoh et al. ............... 701/69
4,866,624 A *  9/1989 Nishikawa et al. ........ 701/89
4,874,056 A * 10/1989 Naito .................... 180/233

(Continued)

FOREIGN PATENT DOCUMENTS

DE     195 04 847 A1     9/1995

(Continued)

OTHER PUBLICATIONS

International Search Report for PCT/EP2004/011167 dated Jan. 18, 2005.

(Continued)

*Primary Examiner*—Lesley D. Morris
*Assistant Examiner*—Daniel Yeagley
(74) *Attorney, Agent, or Firm*—Crowell & Moring LLP

(57) ABSTRACT

A control unit of an at least temporarily four wheel-driven motor vehicle is provided. The control unit is arranged such that a displacement path for an actuator that actuates a transmission clutch is assigned to a setpoint clutch torque via a characteristic curve, and when at least one defined operating condition is present, ensures stable operation of the wheels. The control unit specifies a displacement path which according to the characteristic curve results in a not completely locked state of the transmission clutch, and subsequently computes the actual clutch torque from only the drive slip on the front axle, the drive slip on the rear axle, and the total drive torque.

14 Claims, 2 Drawing Sheets

U.S. PATENT DOCUMENTS

Figure 1:
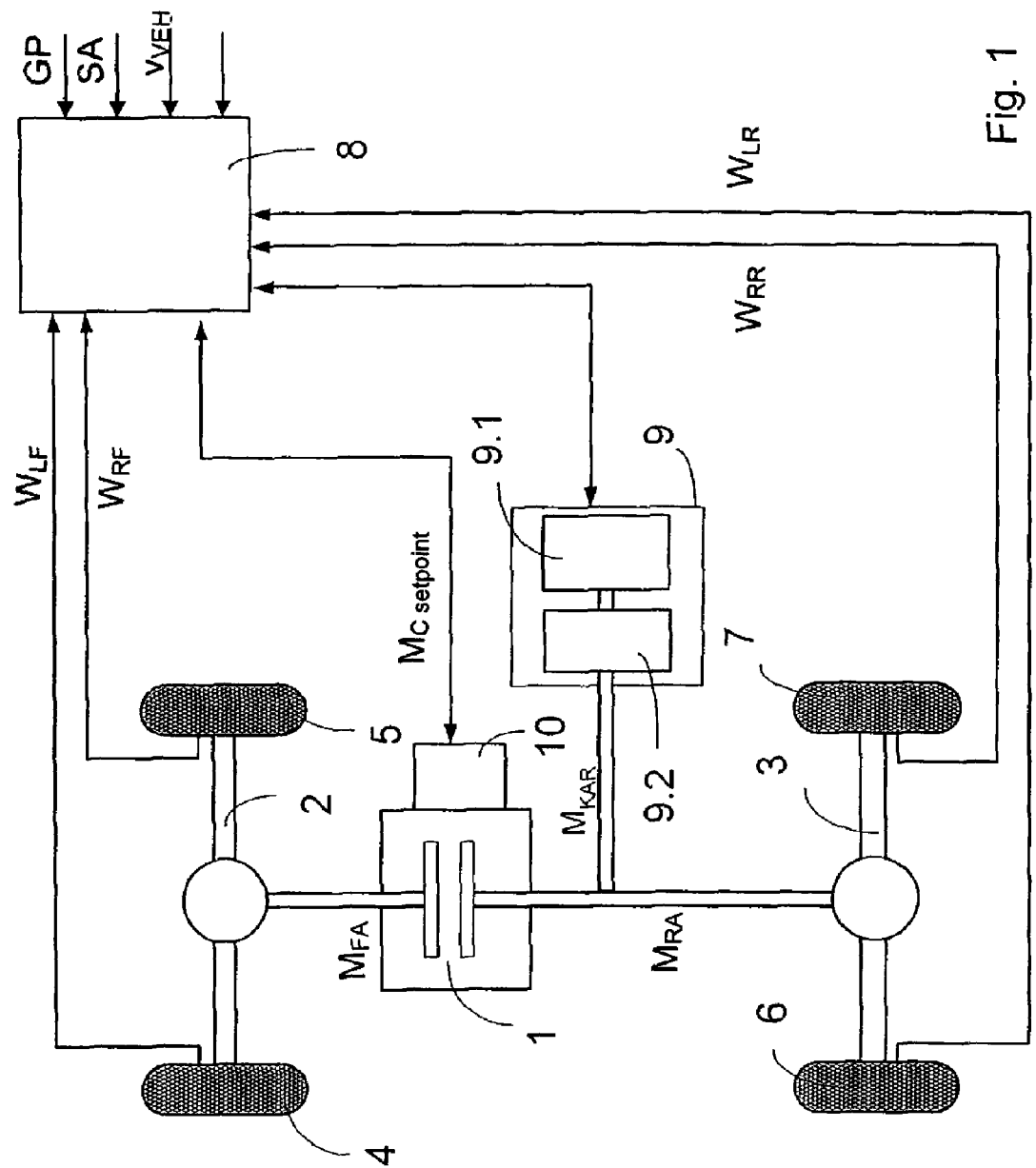

| | | | |
|---|---|---|---|
| 4,989,686 A * | 2/1991 | Miller et al. | 180/197 |
| 5,631,829 A * | 5/1997 | Takasaki et al. | 701/69 |
| 5,754,970 A * | 5/1998 | Takasaki et al. | 701/87 |
| 5,839,084 A * | 11/1998 | Takasaki et al. | 701/67 |
| 5,875,865 A * | 3/1999 | Wakahara et al. | 180/248 |
| 5,927,425 A * | 7/1999 | Kusano | 180/248 |
| 6,001,044 A * | 12/1999 | Amendt | 477/180 |
| 6,330,928 B1 * | 12/2001 | Sekiya et al. | 180/242 |
| 6,386,351 B1 * | 5/2002 | Salecker et al. | 192/54.1 |
| 6,808,037 B1 * | 10/2004 | Mueller | 180/247 |
| 2005/0177295 A1 * | 8/2005 | Rodrigues et al. | 701/67 |
| 2005/0230172 A1 * | 10/2005 | Hopper | 180/247 |

FOREIGN PATENT DOCUMENTS

| | | |
|---|---|---|
| DE | 100 54 023 A1 | 5/2002 |
| EP | 0 319 830 A1 | 6/1989 |
| EP | 1 203 687 A1 | 5/2002 |
| EP | 1 270 305 A2 | 1/2003 |
| WO | WO 02/18814 A1 | 3/2002 |

OTHER PUBLICATIONS

German Examination Report for 103 46 671.1-51 dated Jul. 8, 2004.
Written Opinion for PCT/EP2004/011167.

* cited by examiner

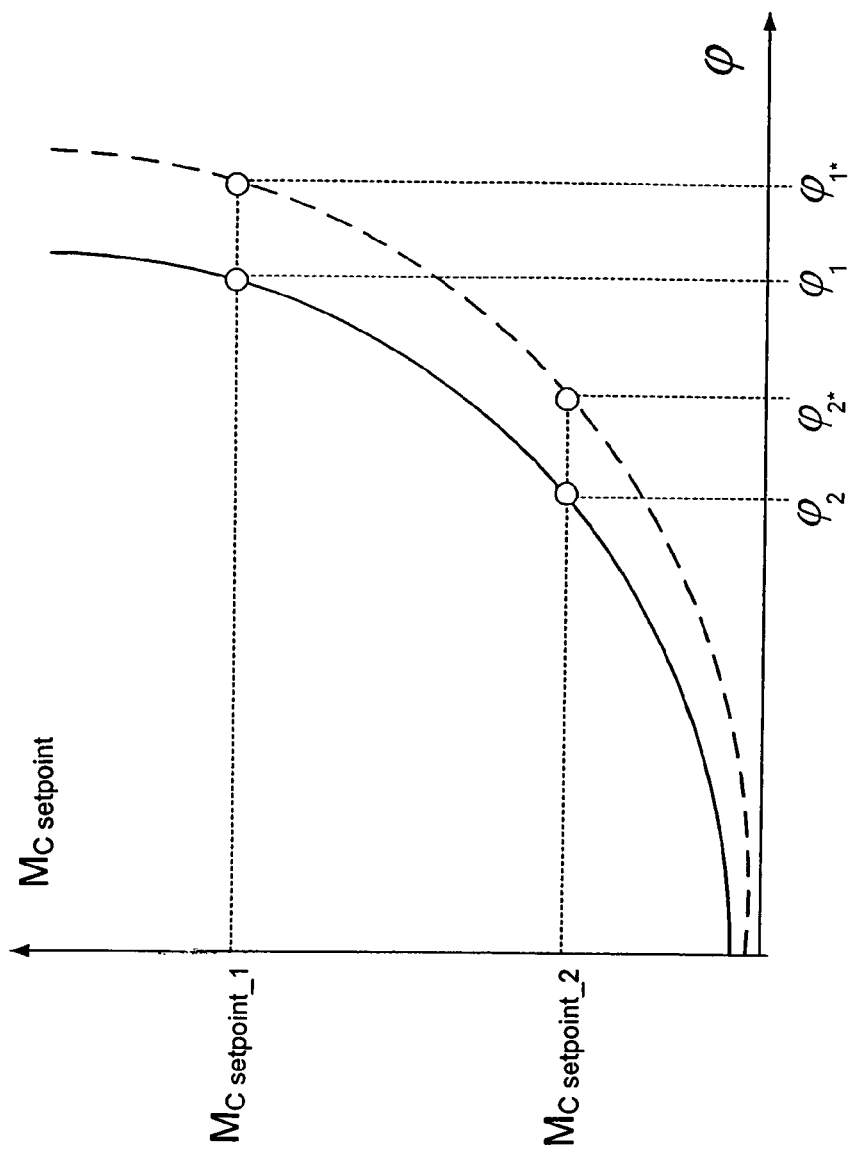
Fig. 2
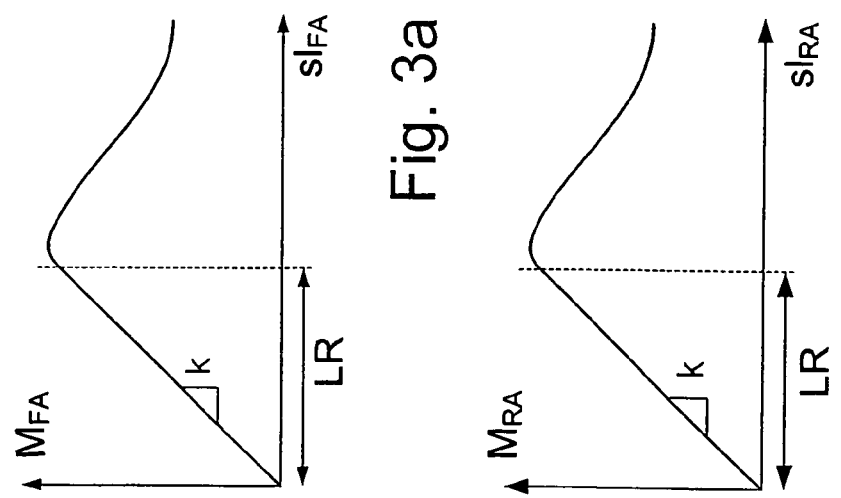
Fig. 3a
Fig. 3b

CONTROL SYSTEM FOR AN AT LEAST TEMPORARILY FOUR WHEEL-DRIVEN MOTOR VEHICLE

CROSS REFERENCE TO RELATED APPLICATIONS

This application is related to U.S. application Ser. No. 11/397,719 filed on even date herewith entitled Control System for an At Least Temporarily Four Wheel-Driven Motor Vehicle.

This application claims priority under 35 U.S.C. § 120 to International Patent Application No. PCT/EP2004/011167 filed Oct. 6, 2004, and under 35 U.S.C. § 119 to German Patent Application No. 103 46 671.1 filed Oct. 8, 2003, the entire disclosure of these documents is herein expressly incorporated by reference.

BACKGROUND AND SUMMARY OF THE INVENTION

The invention relates to a control system for an at least temporarily four wheel-driven motor vehicle.

Such control systems are described in German Patent Document No. DE 100 54 023 A1, for example, according to which a torque distribution device is known for modifying the torque distribution ratio between the wheels on the front axle and the wheels on the rear axle by corresponding control of a friction clutch as a longitudinal lock (transmission clutch). The driving characteristics of a vehicle may be influenced considerably by determining a torque distribution ratio. DE 100 54 023 A1 relates in particular to driving dynamics when cornering.

In the following description, as a generalization the wheels permanently connected to the drive unit are referred to as primary drive wheels, and the wheels which may be connected as required to the drive unit via the transmission clutch are referred to as secondary drive wheels.

Exemplary embodiments of the present invention provide an improved control system of the aforementioned type with respect to the accuracy of control of the transmission clutch.

The invention is based on the finding that for a new system, the characteristic curve in the control unit by which a displacement path is assigned to a setpoint clutch torque results in a relatively accurate actual clutch torque corresponding to the setpoint clutch torque. In an earlier system, however, the same displacement path could result in an actual clutch torque that was less than the setpoint clutch torque.

This can be identified when a difference between the setpoint clutch torque and the clutch torque that is actually set can be determined. The setpoint clutch torque is known, but not the clutch torque that is actually set. The clutch torque that is actually set is computed in the simplest manner possible according to the invention, without the use of additional sensors. The computation is performed only for an operating condition, in particular for stably operating wheels, for which simplifications may be made in the computations, since certain unknown variables may be disregarded.

When reviewing the known slip curves for the front axle and the rear axle, the linear region of the slip curve should preferably be present to ensure stable operation of all wheels without slip. In other words, the tire longitudinal rigidities (k) should be the same for the wheels on the front axle and on the rear axle to ensure that the tire response on the wheels on the front axle are as similar as possible to those on the rear axle (also see the illustration of known slip curves in FIGS. 3a and 3b).

The monitoring of the control accuracy according to the invention is performed preferably by use of the wheel speed sensors or wheel angular velocity sensors, which are present anyway. In this regard, the accuracy of the diagnosis can be increased when it is made under additional operating conditions which ensure that the least possible wheel slip can occur, except as provided by the control inaccuracy of the transmission clutch or the actuator thereof.

The advantage of the invention lies in the diagnosis of control accuracy without additional sensors.

Other objects, advantages and novel features of the present invention will become apparent from the following detailed description of the invention when considered in conjunction with the accompanying drawings.

BRIEF DESCRIPTION OF THE DRAWING FIGURES

The drawing illustrates an exemplary embodiment of the invention, as follows:

FIG. 1 schematically shows a temporarily four wheel-driven vehicle having a transmission clutch, which may be adjusted by a control unit, using the example of a basically rear wheel-driven motor vehicle, which may be switched to front wheel drive via a transmission clutch;

FIG. 2 shows an example of a characteristic curve, as originally stored (represented by a solid line) and as corrected (represented by a dashed line), for assigning a specified setpoint clutch torque to a displacement path of the actuator; and FIGS. 3a and 3b show a typical progression of so-called slip curves for the wheels on the front axle and for the wheels on the rear axle.

DETAILED DESCRIPTION OF THE PREFERRED EMBODIMENTS

FIG. 1 illustrates a temporarily four wheel-driven vehicle in the form of a basically rear wheel-driven motor vehicle which may be switched to front-wheel drive as required via a transmission clutch 1. The transmission clutch 1 is adjustable by means of a control unit 8. The control unit 8 may contain an externally situated auxiliary control device 10 which, for example, converts the specified setpoint clutch torque $M_{C\ setpoint}$ to a current for controlling the adjustment unit for the transmission clutch 1. A characteristic curve, preferably stored in the control unit 8 or in the auxiliary control device 10 (if present), assigns a defined displacement path $\phi$ of the actuator to a setpoint clutch torque $M_{C\ setpoint}$ (see FIG. 2, solid line).

In a vehicle according to FIG. 1, a disengaged transmission clutch 1 transmits the entire torque (total drive torque $M_{KAR}$) of the drive unit 9, which preferably comprises an internal combustion engine 9.1, a transmission 9.2, and at least one drive control device (not specifically illustrated here), to the wheels 6 and 7 on the rear axle 3. In this case, the rear wheels 6 and 7 are the primary drive wheels, since they are permanently connected to the drive unit 9. As the clutch torque on the transmission clutch 1 increases, the drive unit 9 also drives the wheels 4 and 5 on the front axle 2. Thus, the front wheels 4 and 5 are the secondary drive wheels.

For variable torque distribution or for determining a setpoint clutch torque $M_{C\ setpoint}$ to be specified, the control unit 8 also detects additional input signals, in particular the wheel speeds or wheel angular velocities $w_{LF}$, $w_{LR}$, $w_{RF}$, $w_{RR}$ of all wheels 4, 5, 6, 7. For this purpose the control unit 8 also detects or determines, for example, the vehicle speed $v_{VEH}$, the steering angle SA, and the gas pedal value GP. For the diagnosis according to the invention, the angular velocity $w_{FA}$ of the drive shaft with respect to the front axle 2 and the angular velocity $w_{RA}$ of the drive shaft with respect to the rear axle 3 are computed from the wheel angular velocities $w_{LF}$, $w_{LR}$, $w_{RF}$, $w_{RR}$, which are detected anyway. If the control unit 8 or auxiliary control device 10 detects a difference between the angular velocities $w_{FA}$ and $w_{RA}$, a slip of the transmission clutch 1 is present.

Depending on the specified setpoint clutch torque $M_{C\ setpoint}$, i.e., the displacement path $\phi$ of the actuator for the transmission clutch 1, which is adjusted by means of the characteristic curve in FIG. 2 resulting from the setpoint clutch torque $M_{C\ setpoint}$, the total drive torque $M_{KAR}$ is divided into a drive torque $M_{FA}$ transmitted from the front axle and a drive torque $M_{RA}$ transmitted from the rear axle. In the partially locked state, the clutch torque $M_{CLUTCH}$ which is actually set corresponds to the drive torque $M_{FA}$ which is transmitted from the front axle.

According to the invention, when at least one defined operating condition is present which ensures stable operation of the wheels, the control unit 8 or units 8 and 10 specify a displacement path $\phi$ which according to the referenced characteristic curve, results in a not completely locked state of the transmission clutch 1, i.e., the transmission clutch 1 should slip. Stable operation of the wheels is ensured when, for example, the tire longitudinal rigidities (k) are the same for the wheels on the front axle and on the rear axle, i.e., inspection of FIGS. 3a and 3b shows that the diagnosis according to the invention is performed only in the linear region LR of the slip curves. The control unit subsequently computes the actual clutch torque $M_{Clutch}$ from only the drive slip $sl_{FA}$ on the front axle, the drive slip $sl_{RA}$ on the rear axle, and the total drive torque $M_{KAR}$, using the following formula, for example:

$$M_{Clutch} = \frac{1}{1 + \frac{sl_{RA}}{sl_{FA}}} * M_{KAR}$$

where $M_{Clutch}$ is the clutch torque actually set $M_{KAR}$ is the input torque on the transmission clutch, i.e., the total drive torque $sl_{FA}$ is the drive slip on the front axle and $sl_{RA}$ is the drive slip on the rear axle.

The invention is based on the finding that for stably operating wheels, the constants const for computing the drive torque $M_{RA}=\text{const} \times sl_{RA}$ transmitted from the rear axle and the drive torque $M_{FA}=\text{const} \times sl_{FA}$ transmitted from the front axle may be disregarded or truncated. The drive slip on the front axle $sl_{FA}$ and on the rear axle $sl_{RA}$ may be measured, or may be computed using the wheel angular velocities $w_{LF}$, $w_{LR}$, $w_{RF}$, $w_{RR}$.

The displacement path $\phi$ corresponding to a partially locked state according to the characteristic curve, i.e., the slip plausibility checking according to the invention, preferably is specified only for additional defined operating conditions, which in particular cannot be responsible for the occurrence of slip on one or more wheels. At least the following operating conditions are particularly advantageous for this purpose:

Exceeding a predetermined vehicle speed limit ($V_{VEH} > V_{Limit}$). (This essentially ensures a homogeneous coefficient of friction, since differences in the coefficient of friction between the axles become greater with increasing vehicle speed. Coefficients of friction above the natural frequency are negligible for the slip plausibility checking according to the invention.)

Straight-ahead driving (=>no kinematic slip during cornering)

Constant driving (=>no static and dynamic axial load transfers)

Level driving (=>no static and dynamic axial load transfers) and/or

Presence of an at least essentially steady-state condition of the system (in particular, the wheel slip gradients should be at least practically zero).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control system for an at least temporarily four wheel-driven motor vehicle, the control system comprising:
a drive unit permanently coupled to primary drive wheels and coupled to secondary drive wheels as required; and
a control unit, coupled to the drive unit, which variably distributes a drive torque of the drive unit to the primary and secondary drive wheels, and which adjusts a clutch torque of a transmission clutch that is situated between the drive unit and the secondary drive wheels to distribute the drive torque,
wherein the control unit is arranged such that a displacement path for the actuator that actuates the transmission clutch is assigned to a setpoint clutch torque via a characteristic curve, and when at least one defined operating condition is present, which ensures stable operation of the wheels, the control unit specifies a displacement path, which according to the characteristic curve results in a not completely locked state of the transmission clutch, and the control unit subsequently is able to compute the actual clutch torque from only the drive slip on the front axle, the drive slip on the rear axle, and the total drive torque, and
wherein the characteristic curve is corrected by modifying each displacement path assigned to a setpoint clutch torque in proportion to the deviation of the actual clutch torque from the setpoint clutch torque, and is stored.

2. A control system for an at least temporarily four wheel-driven motor vehicle, the control system comprising:
a drive unit permanently coupled to primary drive wheels and coupled to secondary drive wheels as required; and
a control unit, coupled to the drive unit, which variably distributes a drive torque of the drive unit to the primary and secondary drive wheels, and which adjusts a clutch torque of a transmission clutch that is situated between the drive unit and the secondary drive wheels to distribute the drive torque,
wherein the control unit is arranged such that a displacement path for the actuator that actuates the transmission clutch is assigned to a setpoint clutch torque via a characteristic curve, and when at least one defined operating condition is present, which ensures stable operation of the wheels, the control unit specifies a displacement path, which according to the characteristic curve results in a not completely locked state of the transmission clutch, and the control unit subsequently is able to compute the actual clutch torque from only the drive slip on the front axle, the drive slip on the rear axle, and the total drive torque.

3. The control system according to claim 2, wherein an operating condition is exceeding a predetermined vehicle speed limit.

4. The control system according to claim 2, wherein an operating condition is at least essentially straight-ahead driving.

5. The control system according to claim 2, wherein an operating condition is at least essentially constant driving.

6. The control system according to claim 2, wherein an operating condition is at least essentially level driving.

7. The control system according to claim 2, wherein an operating condition is the presence of an at least essentially steady-state condition of the system.

8. A method for a control system for an at least temporarily four wheel-driven motor vehicle, the method comprising the acts of:
variably distributing, by a control unit, a drive torque of a drive unit to primary drive wheels that are permanently connected to the drive unit and secondary drive wheels that can be connected to the drive unit as required;
adjusting, by the control unit, a clutch torque of a transmission clutch that is situated between the drive unit and the secondary drive wheels to distribute the drive torque; and
assigning a displacement path for the actuator that actuates the transmission clutch a setpoint clutch torque via a characteristic curve, and when at least one defined operating condition is present, which ensures stable operation of the wheels, the control unit specifies a displacement path, which according to the characteristic curve results in a not completely locked state of the transmission clutch, and the control unit subsequently is able to compute the actual clutch torque from only the drive slip on the front axle, the drive slip on the rear axle, and the total drive torque.

9. The method according to claim 8, wherein the characteristic curve is corrected by modifying each displacement path assigned to a setpoint clutch torque in proportion to the deviation of the actual clutch torque from the setpoint clutch torque, and is stored.

10. The method according to claim 8, wherein an operating condition is exceeding a predetermined vehicle speed limit.

11. The method according to claim 8, wherein an operating condition is at least essentially straight-ahead driving.

12. The method according to claim 8, wherein an operating condition is at least essentially constant driving.

13. The method according to claim 8, wherein an operating condition is at least essentially level driving.

14. The method according to claim 8, wherein an operating condition is the presence of an at least essentially steady-state condition of the system.

* * * * *